3,223,640
THERMOELECTRIC COMPOSITIONS AND PROCESS FOR PRODUCING SAME

Lothar H. Brixner, Brandywine Hills, Pa., assignor to E. I. du Pont de Nemours and Company, Wilmington, Del., a corporation of Delaware
No Drawing. Filed Sept. 13, 1963, Ser. No. 308,636
9 Claims. (Cl. 252—62.3)

This invention relates to new thermoelectric compositions of matter and to a method for producing the same, and more particularly, thermoelectric compositions comprising at least one chalcogen selected from the group consisting of selenium and tellurium in combination with the three elements tungsten, molybdenum and tantalum.

It is an object of the present invention to provide novel thermoelectric materials which are useful in devices where a Seebeck voltage (thermocurrent) is required. It is a further object of this invention to provide thermoelectric materials which exhibit an exceptionally high Seebeck voltage at elevated temperatures. Another object of this invention is to provide a thermoelectric composition of matter especially valuable for power generating application at high temperatures, within the range of from about 400–700° C. Still another object of this invention is to provide thermoelectric materials exhibiting high Seebeck voltages combined with very low thermal conductivity. An additional object of this invention is to provide novel thermoelectric materials having a figure of merit of at least $0.1 \times 10^{-3}$ at 600° C.

It has been discovered that novel compositions of matter that possess superior thermoelectric properties have the general formula:

$$W_xMo_yTa_{1-(x+y)}Se_zTe_{2-z}$$

wherein tungsten, molybdenum and tantalum must be present and $x$ and $y$ each may have a value of from .400 to .495, said product containing at least one chalcogen selected from the group consisting of selenium and tellurium and wherein $z$ has a value of from 0 to 2 inclusive. In a preferred embodiment of the invention the total value of $x+y$ is from 0.90 to 0.99.

The products of this invention can be prepared by a process which comprises firing under inert conditions or in a vacuum a powdered mixture of the constituent elements in the atomic proportions or ratio specified by the general formula given above. The duration of the firing period will depend upon the reactants used, the size of the charge, and the equipment used in firing. It may be stated as a general rule that firing of the powdered mixture is continued until the X-ray diffraction pattern of the product fails to disclose the characteristic lines of the starting components. The temperature at which the components are fired is within the range of from about 500–1150° C. The time at which the reaction is completed depends, of course, on the temperature; the higher the temperature the shorter the reaction time. Generally the reaction time varies from about 14 to 30 hours. The charge increases in volume during the firing and preferably the fired product should be comminuted, pressed, and also reheated to sinter it to a compact mass before it is used in thermoelectric applications. The physical properties such as firmness and density are improved by including a comminuting, pressing, and sintering step following the firing.

The products of this invention are suitably prepared from the elements making up the composition. However, it is understood that one may start with chalcogen compounds, which may be blended with one or more of the other ingredients to form th desired composition upon firing. Thus, it is possible to start with a known composition, $WSe_2$ for example, and to react this with proportionate required amounts of molybdenum and tantalum or of molybdenum, tantalum and tellurium to obtain a product within the compositional range of the generic formula given above.

In a preferred method of preparation, the thermoelectric compositions of matter of this invention are formed by grinding together the selected component elements. The ground mixture is then fired in an evacuated ($10^{-5}$ mm. Hg) quartz ampoule 15 mm. diameter and 20 cm. long at temperatures in the range of 600–700° C. for about 4 to 8 hours. The fired product is a free flowing black powder which can be remixed inside the ampoule. The product is then refired at, for example, 1100–1150° C. for about 10–16 hours. The product is then pressed into the desired shape and refired to sinter the material into a strong coherent end product. It is preferred to use commercially available reactants of the highest purity, and to have them in a −200 mesh (standard screen scale) particle size before firing. The resulting products are conductors of electricity, possess thermal stability at temperatures of at least 600° C., exhibit extremely low thermal conductivity, and a large Seebeck effect. One particular advantage of the products of this invention is that they have been found to exhibit exceptionally high Seebeck coefficients at high temperatures of the order of 400–700° C.

In addition, all of the products of this invention have a figure of merit of at least $0.1 \times 10^{-3}$ at 600° C. and the preferred composition of matter has a figure of merit of at least $0.3 \times 10^{-3}$ at 600° C. The figure of merit for thermoelectric materials takes into account the fact that low resistivity and low thermal conductivity as well as high Seebeck coefficient are necessary for a good thermoelectric material. The equation for calculating the figure of merit is as follows:

$$Z \text{ (figure of merit in } °C.^{-1}) = \frac{S^2}{rk}$$

where $r$ is resistivity in ohm-cm., $k$ is a thermal conductivity in watts/cm. degree, and S is Seebeck coefficient in v./° C.

For a clearer understanding of the invention, the following specific examples are given. These examples are intended to be merely illustrative of the invention and are not to be considered limitations thereof. All parts given are by weight.

EXAMPLE 1

This example illustrates the preparation of a thermoelectric material having the formula 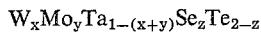. To prepare this material 5.0000 grams tungsten powder, 2.6093 grams molybdenum powder, 0.2008 gram tantalum powder, and 8.7645 grams selenium powder were mixed and placed in a quartz ampoule 15 mm. diameter by 20 cm. long. The quartz ampoule was evacuated and placed in an electric furnace and heated to a temperature of 650° C. After being held at this temperature for 10–14 hours, the ampoule was cooled and the contents thoroughly remixed by shaking the ampoule. The ampoule was again placed in the furnace and was refired at a temperature of 1150° C. for a period of 14 hours. At the end of the firing period the product was removed from the ampoule and was pressed to form a bar ¼" x ¼" x 2". This bar was placed in a quartz container and was refired for a period of 1–2 hours at a temperature of about 600° C. in order to sinter it to a strong coherent end product.

The product thus obtained was examined by X-ray analysis. It was found that it was single phase and none of the lines characteristic of the elements which were used were present in the product.

The structural and electrical data for this product are given in Table I below.

EXAMPLE 2

Following the same procedure as was used in Example 1, a thermoelectric material having the chemical formula $W_{0.485}Mo_{0.485}Ta_{0.03}Se_2$ was prepared. To prepare this material the powdered elements were mixed and heated. The weight of these being as follows: 4.0000 grams tungsten, 2.0874 grams molybdenum, 0.2435 grams tantalum, and 7.0878 grams selenium. The product of this example was tested by X-ray diffraction analysis. It was found to be a single phase and no lines characteristic of the original components were found in the product. The structural and electrical data for this thermoelectrical material are recorded in Table I below.

EXAMPLE 3

According to the procedure given in Example 1, a thermoelectric material having the chemical formula $W_{0.47}Mo_{0.47}Ta_{0.06}SeTe$ was prepared. For this preparation the following amounts of the five elements were used: 2.0000 grams molydenum, 3.8324 grams tungsten, 0.4815 gram tantalum, 3.5018 grams selenium, and 5.6594 grams tellurium. The product of this example was tested by X-ray diffraction analysis. It was found to be single phase and none of the lines characteristic of the starting components were present in the product. The structural and electrical data are given for this composition in Table I below.

EXAMPLE 4

According to the procedure given in Example 1, a thermoelectric material having the chemical formula $W_{0.47}Mo_{0.47}Ta_{0.06}Se_{1.3}Te_{0.7}$ was prepared. For this preparation the following amounts of the elements were used: 2.0000 grams molybdenum, 3.8324 grams tungsten, 0.4815 gram tantalum, 4.5524 grams selenium, and 3.9620 grams tellurium. The product of this example was examined by X-ray diffraction analysis. It was single phase and no lines of the original components were found in the product. Electrical and structural data for this composition are recorded in Table I below, together with the thermoelectric parameters.

I claim:

1. A process for the production of thermoelectric compositions of matter having the general formula $$W_xMo_yTa_{1-(x+y)}Se_zTe_{2-z}$$

wherein tungsten, molybdenum and tantalum must be present and $x$ and $y$ each have values of from .470 to .495, said compositions containing at least one chalcogen selected from the group consisting of selenium and tellurium and wherein $z$ has a value of from 0 to 2 inclusive, said process comprising firing under an inert atmosphere at a temperature within the range of about 500° to 1150° C. for from about 4 to 30 hours a powdered mixture of the constituent elements in atomic proportions according to said formula until the X-ray diffraction pattern of the product fails to disclose the characteristic lines of the starting components.

2. A process for the production of thermoelectric compositions of matter having the general formula $$W_xMo_yTa_{1-(x+y)}Se_zTe_{2-z}$$

wherein tungsten, molybdenum and tantalum must be present and $x$ and $y$ each have values of from .470 to .495, said compositions containing at least one chalcogen selected from the group consisting of selenium and tellurium and wherein $z$ has a value of from 0 to 2 inclusive; said process comprising firing under an inert atmosphere at a temperature within the range of from 500 to 1150° C. for 14 to 30 hours a powdered mixture of the constituent elements in atomic proportions according to said formula.

3. A process for the production of thermoelectric compositions of matter having the general formula $$W_xMo_yTa_{1-(x+y)}Se_zTe_{2-z}$$

wherein tungsten, molybdenum and tantalum must be present and $x$ and $y$ each have values of from .470 to .495, said compositions containing at least one chalcogen selected from the group consisting of selenium and tellurium and wherein $z$ has a value of from 0 to 2 inclusive; said process comprising firing under an inert atmosphere at a temperature of about 650° C. for about 10 to 14 hours a powdered mixture of the constituent elements in atomic

*Table I*

| | Room Temperature Structural Data | | | 600° C. Thermoelectric Data | | | |
|---|---|---|---|---|---|---|---|
| Exp. No. | $a_0$ (A.) | $c_0$ (A.) | Type | $\rho$ m$\Omega$cm. | S, $\mu$v./° C. | K, milliwatts cm. dg. | Z, dog.$^{-1}$ ×10$^3$ |
| 1. $Mo_{0.49}W_{0.49}Ta_{0.02}Se_2$ | 3.292 | 12.929 | $D^4_{6h}$ | 19.6 | 260 | 22 | 0.2 |
| 2. $Mo_{0.485}W_{0.485}Ta_{0.03}Se_2$ | 3.294 | 12.916 | $D^4_{6h}$ | 8.1 | 240 | 22 | 0.3 |
| 3. $Mo_{0.47}W_{0.47}Ta_{0.06}SeTe$ | 3.390 | 13.560 | $D^4_{6h}$ | 4.8 | 136 | 18 | 0.2 |
| 4. $Mo_{0.47}W_{0.47}Ta_{0.06}Se_{1.3}Te_{0.7}$ | 3.345 | 13.273 | $D^4_{6h}$ | 13.3 | 176 | 19 | 0.1 |

$a_0$ and $c_0$ are crystal lattice parameters.
$\rho$ is electrical resistivity.
S is Seebeck coefficient.
K is thermal conductivity.
Z is figure of merit.

The products of this invention have been found to be useful in generating electric current directly from thermal energy without reliance upon mechanical parts. Thermoelectric generators are well known in the art, and thermoelectric elements of a size and shape to fit any particular generator can be prepared from the compositions of this invention by compacting these compositions into the deside shape and size prior to the final firing.

Since it is obvious that many changes and modifications can be made in the above described details without departing from the nature and spirit of the invention, it is to be understood that the invention is not to be limited to said details except as set forth in the appended claims.

proportions according to said formula, remixing and refiring the product at a temperature of about 1150° C. for about 14 hours.

4. A thermoelectric composition of matter having the formula $W_xMo_yTa_{1-(x+y)}Se_zTe_{2-z}$, wherein tungsten, molybdenum and tantalum must be present and $x$ and $y$ each have values of from .470 to .495, said composition containing at least on chalcogen selected from the group consisting of selenium and tellurium and wherein $z$ has a value of from 0 to 2 inclusive.

5. A thermoelectric composition of matter having the formula $W_xMo_yTa_{1-(x+y)}Se_zTe_{2-z}$, wherein tungsten, molybdenum and tantalum must be present and the total value of $x+y$ is from 0.90 to 0.99, said composition containing at least one chalcogen selected from the group consisting of selenium and tellurium and wherein $z$ has a value of from 0 to 2 inclusive.

6. A thermoelectric composition of matter having the formula $W_{0.47}Mo_{0.47}Ta_{0.06}SeTe$.

7. A thermoelectric composition of matter having the formula $W_{0.49}Mo_{0.49}Ta_{0.02}Se_2$.

8. A thermoelectric composition of matter having the formula $W_{0.485}Mo_{0.485}Ta_{0.03}Se_2$.

9. A thermoelectric composition of matter having the formula $Mo_{0.47}W_{0.47}Ta_{0.06}Se_{1.3}Te_{0.7}$.

References Cited by the Examiner

Journal of Inorganic and Nuclear Chemistry, March 1962, vol. 24, pp. 257–263, 252–518.

JULIUS GREENWALD, *Primary Examiner.*